United States Patent [19]
Sakamoto et al.

[11] Patent Number: 5,132,649
[45] Date of Patent: Jul. 21, 1992

[54] SIGNAL INPUT DEVICE

[75] Inventors: Yukio Sakamoto; Toshimi Kaneko; Kazuo Dougauchi; Junichiro Wata, all of Nagaokakyo, Japan

[73] Assignee: Murata Manufacturing Co., Ltd., Nagaokakyo, Japan

[21] Appl. No.: 750,258

[22] Filed: Aug. 27, 1991

[30] Foreign Application Priority Data

Aug. 30, 1990 [JP] Japan .................. 2-230200

[51] Int. Cl.5 .................. H03H 7/00; H04B 3/28
[52] U.S. Cl. .................. 333/167; 333/12; 333/24 R; 333/177
[58] Field of Search ............ 333/167, 185, 172, 177, 333/206, 175, 176, 132, 12, 24 R, 181; 343/850, 851

[56] References Cited
U.S. PATENT DOCUMENTS 4,760,356 7/1988 Kempster .................. 333/177

FOREIGN PATENT DOCUMENTS 49-86753 7/1974 Japan .
62-58931 4/1987 Japan .

Primary Examiner—Eugene R. Laroche
Assistant Examiner—Ali Neyzari
Attorney, Agent, or Firm—Burns, Doane, Swecker & Mathis

[57] ABSTRACT

A signal input device having a mutual inductor formed by a coil connected with a capacitor for a grounding cable in series and a coil connected with a capacitor for a signal cable in series, and a compensating capacitor connected with the series circuit composed of the capacitor and the coil on the grounding cable in parallel. The compensating capacitor serves to prevent occurrence of a voltage on the grounding cable, and accordingly only regular signals received by an antenna are transmitted. The mutual inductor prevents resonance of inductance of a lead terminal of the compensating capacitor with capacitance of the compensating capacitor.

3 Claims, 3 Drawing Sheets

SIGNAL INPUT DEVICE

BACKGROUND OF THE INVENTION

1. Field of the Invention

The present invention relates to a signal input device, and more particularly to a signal input device adapted to be used for leading signals received by an antenna into an electronic appliance such as a transformerless type television through a coaxial cable or the like.

2. Description of Prior Art

Generally, in a transformerless type television, signals received by an antenna are led into the television through a signal input device containing an electrical circuit as shown in FIG. 5. An input terminal 45 is connected to e.g. a coaxial cable 47 in the antenna side, and an output terminal 46 is connected to e.g. a coaxial cable 48 in the television side. Between the terminals 45 and 46, a CR parallel circuit 49 with a discharge gap is provided for a signal cable, and a CR parallel circuit 50 is provided for a grounding cable. The terminals 45 and 46 are insulated from each other in a low frequency range (e.g. 60 Hz) and coupled each other in a high frequency range.

When a television with such a signal input device is set in a strong electric field (grounding of the wire from the antenna to the television is secure), a coaxial cable extending from the signal input device to the tuner and a chassis are exposed to a strong direct wave, and a ghost image appears on the screen of the television. In order to solve this problem, Japanese Utility Model Laid Open Publication No. 62-58931 discloses that the coaxial cable of the signal input device is inserted in a hole of a ring ferrite core. This structure permits having little insertion loss but not sufficiently preventing the ghost image.

Japanese Utility Model Laid Open Publication No. 49-86753 discloses that a balun is provided in such a signal input device. This structure permits preventing the ghost image sufficiently but causes great insertion loss. Accordingly, when the television is set in a weak electric field, noise figure becomes bad. Further, in either of the structures above, when the television is exposed to a strong direct wave, great impedance occurs because a capacitor for the grounding cable in the signal input device does not have a large capacity. Accordingly, it is impossible to completely suppress a voltage induced by the direct wave.

SUMMARY OF THE INVENTION

It is an object of the present invention to provide a signal input device for leading regular signals from an antenna into an electronic appliance such as a television, the signal input device being improved in prevention of occurrence of a ghost image in a strong electric field and of worsening the noise figure in a weak electric field.

In order to attain the object, a signal input device according to the present invention comprises a mutual inductor formed by a coil connected with a capacitor for a grounding cable in series and a coil connected with a capacitor for a signal cable in series, and a compensating capacitor connected with the series circuit composed of the capacitor and the coil on the grounding cable in parallel.

Since the compensating capacitor is connected with the capacitor on the grounding cable in parallel, the total capacitance for the grounding cable is increased, and the impedance of the capacitor for the grounding cable is decreased. Accordingly, occurrence of a voltage on the grounding cable is prevented, and only regular signals received by an antenna are transmitted. Further, the signal input device has small insertion loss and is hardly influenced by a direct wave even in a strong electric field.

The mutual inductor prevents resonance of inductance of a lead terminal of the compensating capacitor with the capacitance of the compensating capacitor.

In the signal input device, it is preferred that the coils forming the mutual inductor are between the output terminals and the capacitors on the grounding cable and the signal cable respectively. This structure permits more stable transmission of regular signals from the antenna to a high frequency appliance.

Moreover, it is preferred that the mutual inductor comprises a ring magnetic member, an internal terminal inserted in a hole of the ring magnetic member and a core wire piercing through the internal terminal. In this case, the internal terminal serves as the coil on the grounding cable, and the core wire serves as the coil on the signal cable.

BRIEF DESCRIPTION OF THE DRAWINGS

This and other objects and features of the present invention will become apparent from the following description taken in conjunction with the preferred embodiments thereof in reference to the accompanying drawings, in which.

DESCRIPTION OF THE PREFERRED EMBODIMENTS

An exemplary signal input device according to the present invention is hereinafter described referring to the accompanying drawings.

Figure 1:
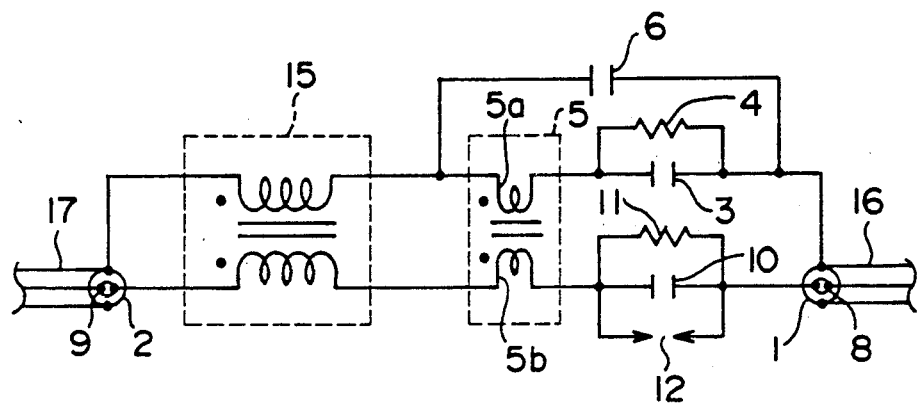
FIG. 1 is an electrical circuit of a signal input device according to the present invention.

FIG. 1 illustrates an electrical circuit of a signal input device according to the present invention. Between an input terminal 1 and an output terminal 2 of a grounding cable, a parallel circuit composed of a capacitor 3 and a resistor 4 is disposed. Between an input terminal 8 and an output terminal 9 of a signal cable, a parallel circuit composed of a capacitor 10, a resistor 11 and a discharge gap 12 is disposed. The terminals 1 and 2 of the grounding cable are insulated from each other in a low frequency range (e.g. 60 Hz) and coupled each other in a high frequency range via the capacitor 3. Likewise, the terminals 8 and 9 of the signal cable are insulated from each other in a low frequency range and coupled each other in a high frequency range via the capacitor 10. The resistors 4 and 11 serve to discharge electricity from the capacitors 3 and 10 respectively.

A mutual inductor 5 consists of a coil 5a connected with the capacitor 3 for the grounding cable in series and a coil 5b connected with the capacitor 10 for the signal cable in series. This mutual inductor 5 serves to prevent resonance of inductance of a lead terminal of a compensating capacitor 6 with capacitance of the capacitor 6.

The compensating capacitor 6 is connected to the series circuit composed of the coil 5a and the capacitor 3 in parallel. The compensating capacitor 6 is provided to increase the total capacitance for the grounding cable, and this results in reduction of impedance of the grounding cable. Accordingly occurrence of a voltage of the capacitors 3 and 6 for the grounding cable is prevented, and only regular signals from the antenna are transmitted to the output terminals 2 and 9. Further, insertion loss is small, and this electrical circuit is hardly influenced by a direct wave even in a strong electric field.

In this embodiment, a common mode choke coil 15 is connected to the output terminals 2 and 9, such that common mode noise is inhibited from entering an electronic appliance such as a television. Specifically, the common mode choke coil 15 is formed by winding a coaxial cable of the signal input device around a toroidal ferrite core several times.

The input terminals 1 and 8 are connected to a coaxial cable 16 extending from the antenna, and the output terminals 2 and 9 are connected to a coaxial cable 17 leading to the electronic appliance.

Figure 2:
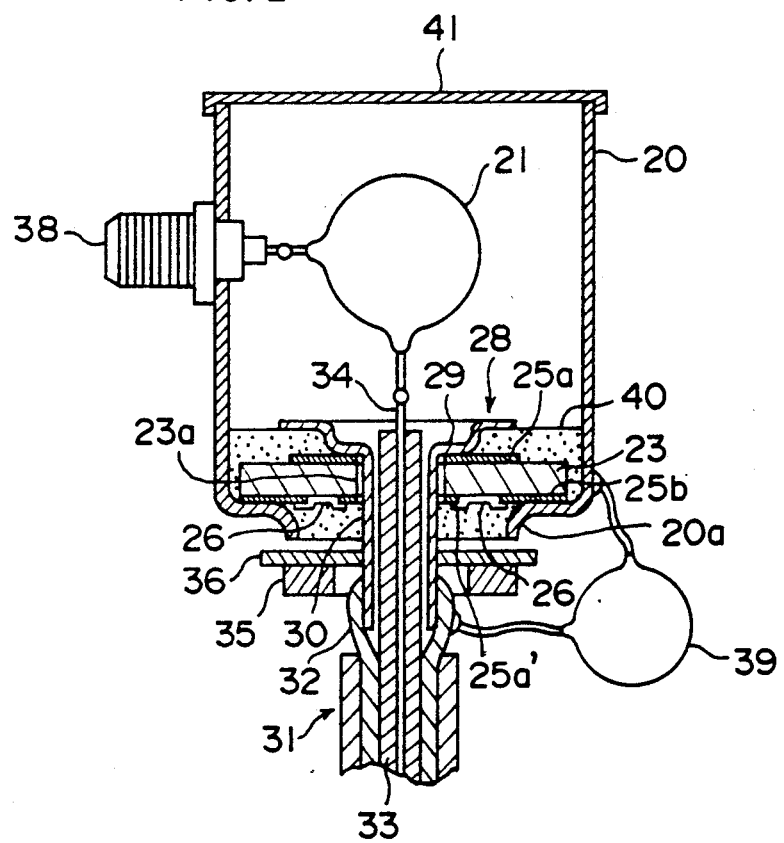
FIG. 2 is a vertical sectional view of a signal input device containing the electrical circuit shown in FIG. 1.

FIG. 2 shows a signal input device containing the electrical circuit shown in FIG. 1.

Inside a metal shield case 20, a coupling capacitor 21 and a donut-like dielectric 23 are disposed. The shield case 20, which is of a box type, has a circular opening 20a on one side thereof, and the opposite side is closed by a lid 41. The coupling capacitor 21 is a CR composite part with a discharge gap, and its electrical equivalent circuit corresponds to the parallel circuit composed of the capacitor 10, the resistor 11 and the discharge gap 12 shown in FIG. 1.

Figure 3A:
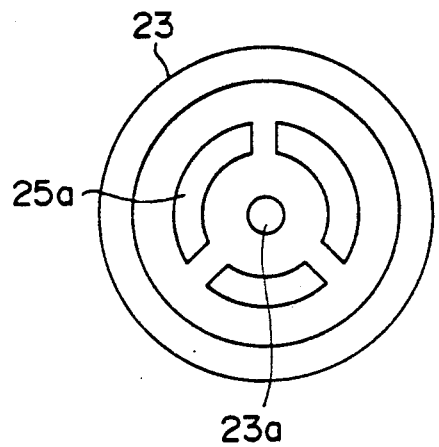
FIGS. 3a and 3b are a top view and a bottom view of a dielectric serving as a capacitor for a grounding cable.
Figure 3B:
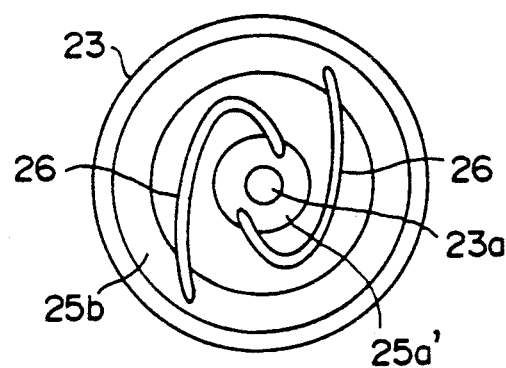

The donut-like dielectric 23 has a sintered body made of ceramic powder such as $BaTiO_3$. The dielectric 23, as shown in FIGS. 3a and 3b, has a hole 23a in the center. On the upper and lower surfaces of the dielectric 23, first capacity electrodes 25a and 25a', and a second capacity electrode 25b are formed into rings around the hole 23a. The first capacity electrodes 25a and 25a' are soldered together as described later. Two resistors 26 are formed, e.g. printed such that they are laid between the capacity electrodes 25a' and 25b.

An internal terminal 28 is inserted in the hole 23a of the dielectric 23. The internal terminal 28 is a conductive metal tube, and it has a head 29 of a larger diameter and a shaft 30 of a smaller diameter.

The capacity electrode 25b is soldered to the inner wall of the shield case 20 near the circular opening 20a. The capacity electrode 25a of the dielectric 23 is soldered to the outer wall of the head 29 of the internal terminal 28, and the capacity electrode 25a' is soldered to the outer wall of the shaft 30 of the internal terminal 28. The dielectric 23 and the internal terminal 28 which are soldered to each other as above are surrounded by a filler 40 such as epoxy resin so as to be fitted in the shield case 20 securely. An equivalent circuit of the dielectric 23 having the resistors 26, the capacity electrodes 25a, 25a' and 25b corresponds to the parallel circuit composed of the capacitor 3 and the resistor 4 shown in FIG. 1.

The shaft 30 of the internal terminal 28 further pierces through an insulating plate 36 for insulating a ring ferrite core 35 from the shield case 20. The ferrite core 35, the shaft 30 of the terminal 28 and a signal cable 34, which is a core wire of a coaxial cable 31 of the signal input device, serve as the mutual inductor 5 shown in FIG. 1. The end of the shaft 30 is connected to a grounding cable 32, which is a braided wire, of the coaxial cable 31. The signal cable 34, which is coated with an insulating material 33, pierces through the internal terminal 28 and extends to a lead terminal of the coupling capacitor 21. The coaxial cable 31 is connected with a fitting (not shown) corresponding to the output terminals 2 and 9 shown in FIG. 1 in the other end. The other lead terminal of the coupling capacitor 21 is connected with a fitting 38 fixed on the shield case 20. The fitting 38 corresponds to the input terminals 1 and 8 shown in FIG. 1. A lead terminal of the compensating capacitor 39 is soldered to the grounding cable 32 of the coaxial cable 31, and the other lead terminal thereof is soldered to the outer wall of the shield case 20. The compensating capacitor 39 corresponds to the compensating capacitor 6 shown in FIG. 1.

Further, the common mode choke coil 15 shown in FIG. 1 is omitted in the illustration of FIG. 2.

Figure 4:
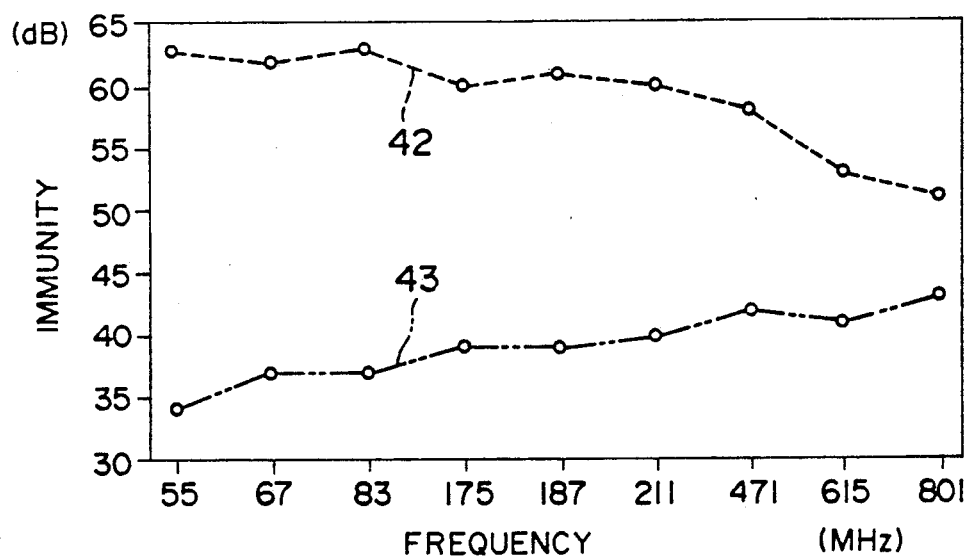
FIG. 4 is a graph plotting immunity of the signal input device and frequency.
Figure 5:
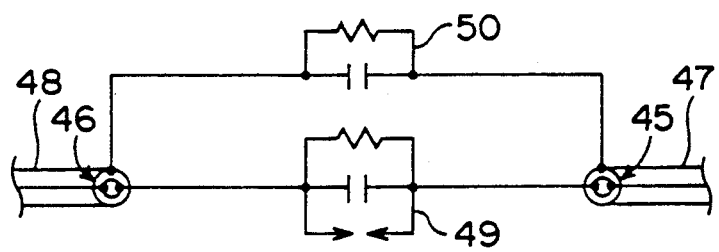
FIG. 5 is an electrical circuit of a conventional signal input device.

FIG. 4 shows a measurement result of immunity of the signal input device, and the capacity of the device to prevent an ghost image is apparent from FIG. 4. The immunity was measured under conditions that the capacitance brought about by the capacity electrodes 25a, 25a' and 25b, and the dielectric 23 is 2000 pF, that the capacitance of the coupling capacitor 21 is 130 pF and that the capacitance of the compensating capacitor 39 is 3000 pF although 1000 pF brings about immunity effect. The graph of FIG. 4 plots immunity on the axis of ordinates versus frequency on the axis of abscissas. The immunity characteristic of the signal input device of the present invention is indicated by the dotted line 42. For comparison, the immunity characteristic of a conventional signal input device is indicated by the two-dot chain line 43. According to the graph, the immunity of the signal input device of the present invention is superior to that of the conventional one by 20 to 25 dB in regard to a VHF band of a television.

Although the present invention has been described in connection with the preferred embodiment above, it is to be noted that various changes and modifications are apparent to a person skilled in the art. Such changes and modifications are to be understood as being within the scope of the present invention defined by the appended claims.

For example, the coils forming the mutual inductor may be disposed between the input terminals and the capacitors on the grounding cable and on the signal cable respectively According to the destination of the signal input device, the discharge resistors 4 and 11 may be omitted The compensating capacitor does not always have to be disposed outside the shield case but may be disposed inside the shield case.

What is claimed is:

1. A signal input device employed in a signal input circuit of a high frequency appliance, the signal input device comprising:
   a capacitor disposed between an input terminal and an output terminal of a grounding cable;
   a capacitor disposed between an input terminal and an output terminal of a signal cable;
   a mutual inductor comprising a coil connected with the capacitor for the grounding cable in series and a coil connected with the capacitor for the signal cable in series; and a compensating capacitor connected with the series circuit composed of the capacitor and the coil on the grounding cable in parallel.

2. The signal input device of claim 1, wherein the coils forming the mutual inductor are between the output terminals and the capacitors on the grounding cable and on the signal cable respectively.

3. The signal input device of claim 1, wherein the mutual inductor comprises a ring magnetic member, an internal terminal inserted in a hole of the ring magnetic member and a core wire piercing through the internal terminal.

* * * * *